Dec. 23, 1941.   F. A. STEVENS   2,267,051
OPHTHALMIC MOUNTING
Filed Dec. 21, 1939

Inventor:
Frederick A. Stevens
By
Attorneys.

Patented Dec. 23, 1941

2,267,051

UNITED STATES PATENT OFFICE 2,267,051

OPHTHALMIC MOUNTING

Frederick A. Stevens, Providence, R. I., assignor of one-half to Martin-Copeland Company, Providence, R. I., a trusteeship Application December 21, 1939, Serial No. 310,414

5 Claims. (Cl. 88—47)

The present application is a continuation in part of my copending application for United States Letters Patent for Ophthalmic mounting, Serial No. 30,359, filed July 8, 1935.

In ophthalmic mountings heretofore used it has been a common practice to provide the bridge-member and temple-supporting member with straps which overlie the opposite faces of the lens and embody a shoe engageable with the edge thereof. To avoid play or looseness in such mountings the holes or perforations in the lens must be accurately positioned with respect to the edge of the lens. If the perforations in the lens and straps do not register accurately when the shoe is placed against the edge of the lens the lens will either be too lose, permitting play and a shackly connection, or too tight which is apt to break the lens upon final tightening of the screw. Furthermore, a number of different sizes of such mountings must be supplied to the optician to accommodate the variations in the thickness and curvature of different lenses. Moreover, with such prior ophthalmic mountings the screw used to clamp the straps to the lens is apt to loosen during use.

One of the objects of the present invention is to provide an ophthalmic mounting of the type indicated in which the tightening of a nut against the lens-strap operates automatically to draw the mounting into place to seat its shoe snugly against the edge of the lens.

Another object of the invention is to provide an ophthalmic mounting of the type indicated having a relatively thin and flexible lens-strap adapted to bend upon tightening the nut to cause the strap to conform to the contour of the faces of lenses of different shapes and thicknesses.

Another object of the invention is to provide an ophthalmic mounting of the type indicated in which the nut is canted with respect to the screw upon tightening it against the lens-strap to cause it to bind upon the threads of the screw.

Still another object of the invention is to provide an ophthalmic mounting of the type indicated which is of simple and compact construction to adapt it for economical manufacture.

Further objects of the invention are set forth in the following specification which describes a preferred form of construction of the improved mounting, by way of example, as illustrated by the accompanying drawing. In the drawing.

Figure 1:
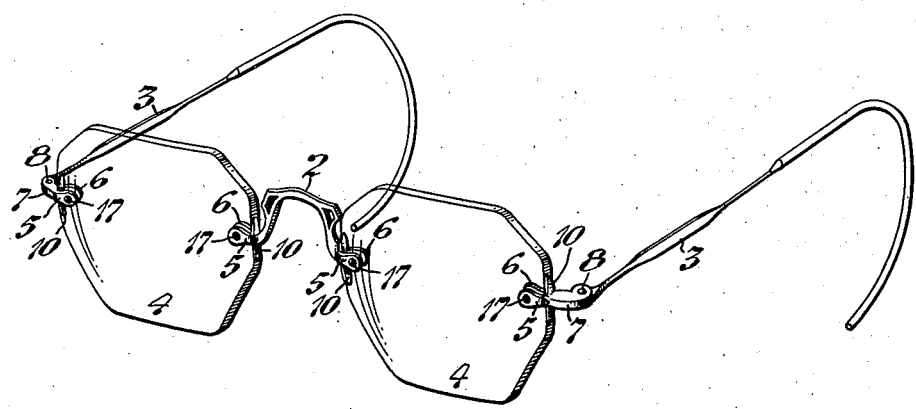
Fig. 1 is a perspective view illustrating a pair of rimless spectacles embodying the improved mounting of the present invention.

Referring to the accompanying drawing, the present improved mounting is herein shown as applied to a pair of rimless spectacles for attaching the bridge or nose-piece 2 and also the temples 3 to the lenses 4. A pair of mountings are preferably made integral with the bridge or nose-piece 2 projecting from the sides thereof for connection to the pair of lenses 4. The mounting for each lens 4 comprises a pair of straps or ears 5 and 6 adapted to overlie the opposite faces of the lens adjacent its edge. It will be understood that the straps 5 and 6 may be of any shape in outline and ornamented with any desired artistic design. In the case of the mounting for each of the temples 3 the ears or straps 5 and 6 are formed as a part of bifurcated hinge-member 7 to which the end of the temple 3 is pivoted by means of a screw or rivet 8.

Figures 2, 3:
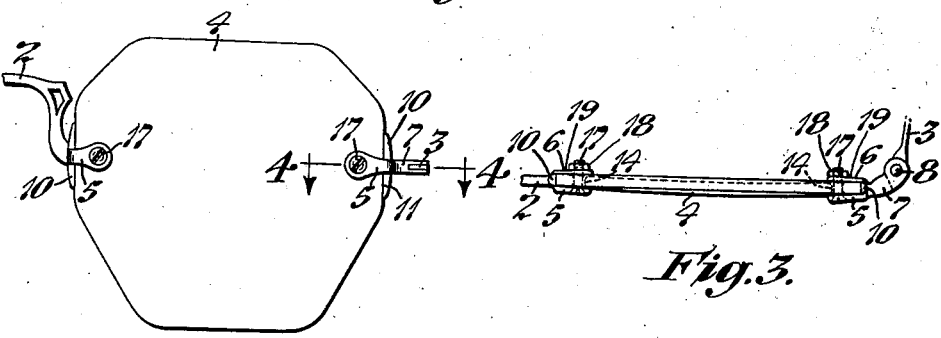
Fig. 2 is an enlarged front view of one of the spectacle lenses showing the shoes on the bridge and temple-supporting members tightly engaging the edges of the lens.
Fig. 3 is an edge view of the same showing the straps on the mounting engaging the opposite faces of the lens.
Figure 6:
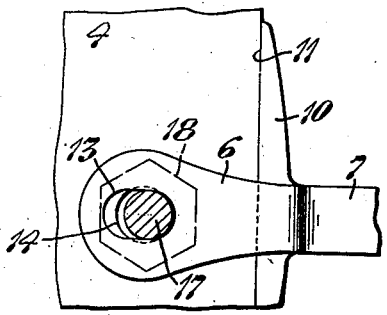
Fig. 6 is a sectional view taken on line 6—6 of Fig. 4 showing the elongate slot in the wedge-shaped strap to permit relative movement between the strap and screw.

Referring more particularly to Figs. 2 and 6, the ears or straps 5 and 6 on the bridge 2, or hinge-member 7, are joined to an elongate shoe 10 which may be of lenticular shape with its flat face 11 adapted to abut the edge of the lens 4. When the mounting is to be used with lenses of circular outline the shoe 10 may be formed or bent to arcuate shape on its inner face to adapt it to fit snugly against the curved edge of the lens.

Figure 4:
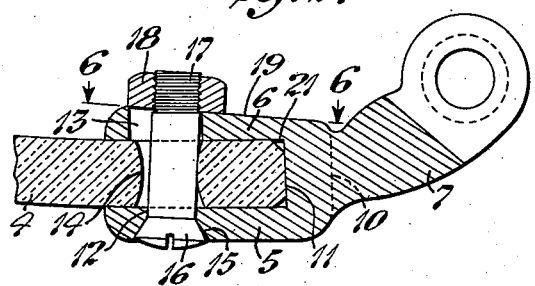
Fig. 4 is a greatly enlarged transverse sectional view taken on line 4—4 of Fig. 2 showing the wedge shape of one of the straps which cooperates with the nut for drawing the straps inwardly from the edge of the lens and canting the nut on the screw.

As illustrated most clearly in Fig. 4, the strap 5 has a hole or perforation 12 adjacent its outer end and the opposite strap 6 has a perforation or slot 13 alined with the perforation 12. The lens 4 is of usual construction having holes 14 drilled adjacent its opposite edges and flared at their ends. The hole 12 in the lens-strap 5 is countersunk at 15 to receive the beveled head 16 of a screw 17 and the shank of the screw projects through the hole 14 in the lens 4 and the slot 13 in the lens-strap 6. A nut 18 threaded onto the end of the screw 17 engages the strap 6 and cooperates with the head 16 of the screw 17 to clamp the two straps against the opposite faces of the lens 4.

In accordance with the present invention the strap 6 engaged by the nut 18 is tapered in thickness longitudinally or of wedge shape as illustrated in Fig. 4, being relatively thin where it is connected to the bridge 2 or temple hinge-member 7 to render it flexible and gradually increasing in thickness toward its opposite end. Thus, the outside face 19 of the strap 6 is inclined with respect to the cooperating face 20 of the nut 18 whereby the latter tends to slide down the incline toward the shoe 10 when tightened on the screw 17. Furthermore, the perforation 13 in the strap 6 is made elongate or in the form of a slot to permit the screw 17 to move longitudinally of the strap.

Figure 5:
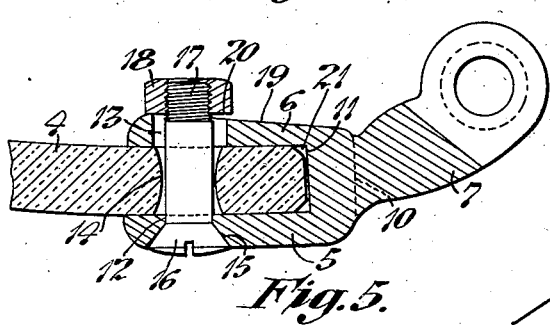
Fig. 5 is a view similar to Fig. 4 showing the relationship of the parts before the nut is tightened on the screw.

In applying the mounting to the lens 4 the edge portion of the lens is placed in the opening 21 between the straps 5 and 6 to aline the perforation 14 in the lens with the perforations 12 and 13 in the straps. The screw 17 is inserted through the alined perforations 12, 14 and 13 in the strap 5, lens 4 and strap 6, respectively, to seat its head 16 in the countersunk recess 15, the shank of the screw fitting somewhat loosely in the hole 14 in the lens to facilitate the insertion of the screw. The nut 18 is then threaded onto the end of the screw 17 to the position illustrated in Fig. 5. It will be noted by reference to this latter view that the edge of the lens 4 may be spaced from the inside face of the shoe 10 and the shank of the screw spaced from the side of the hole 14 in the lens. Upon tightening the nut 18 the engagement of its inner face 20 with the inclined face 19 of the strap 6 causes it to slide thereon toward the shoe 10. As the nut 18 slides on the inclined face 19 of the wedge-shaped strap 6 the shank of the screw 17 engages against the side of the hole 14 in the lens 4 and acts with a prying force to draw the mounting inwardly with respect to the edge of the lens to seat the inside face of the shoe 10 snugly thereagainst. After the shoe 10 is engaged in firm contact with the edge of the lens 4 the nut 18 will turn on the strap 6 without further camming or wedging action. In other words, the engagement of the nut with the inclined face 19 acts to adjust the mounting to clamp the shoe against the edge of the lens 10 under predetermined pressure, after which the nut 18 merely turns on the inclined face without applying a force sufficient to cause the lens to break. Upon tightening the nut 18 the relatively thin and flexible strap 6 may bend about its point of joinder with the shoe 10 to cause the strap to conform to the contour of the face of lenses of different thicknesses or shapes within predetermined limits, the line of bending being controlled by the weakened section of the strap resulting from its taper.

Upon final tightening of the nut 18 on the screw 17 the inclined face 19 of the strap 6 causes the nut to be canted with respect to the screw, see Fig. 4. The threads on the nut 18 and screw 17 will consequently be caused to bind one on the other to lock the nut against turning. Thus, the nut is locked in tightened position on the screw and will not become loosened during normal use of the spectacles. With the parts assembled as explained above, the shoe 10 seats against the edge of the lens 4, the shank of the screw 17 bears against the side of the hole 14 in the lens, and the straps 5 and 6 bear firmly against the opposite faces of the lenses to provide a rigid and secure connection between the parts.

It will be observed from the foregoing specification that the present invention provides an improved form of ophthalmic mounting which operates automatically upon turning the nut on the screw to bind the shoe of the mounting against the edge of the lens, flex the lens-strap to cause it to conform to the contour of a lens face of any shape or thickness and cant the nut with respect to the screw to bind it in locked engagement thereon.

While the present improved mounting is herein shown and described as embodied is a preferred form of construction, it is to be noted that various modifications may be made in the structure and arrangement of its parts without departing from the spirit or scope of the invention. Therefore, without limiting myself in this respect, I claim:

1. An improved mounting for eyeglasses and spectacles comprising a member having straps adapted to overlie the opposite faces of the lens and a shoe for engagement with the edge thereof, said straps and lens having perforations and one of said straps being wedge-shaped longitudinally with a relatively thin portion at its point of connection to the member to adapt it to flex, a screw extending through the perforations in the straps and lens, the perforation in the wedge-shaped strap being larger than the screw to permit lateral movement of the screw therein, and a nut threaded onto the end of the screw and engageable with the wedge-shaped strap, said nut and wedge-shaped strap acting to tilt the screw to draw the member inwardly of the lens to engage its shoe with the edge of the lens and said strap flexing into engagement with the face of the lens.

2. An improved mounting for eyeglasses and spectacles comprising a member having straps adapted to overlie the opposite faces of the lens and a shoe for engagement with the edge thereof, said straps and lens having perforations and one of said straps being wedge-shaped with a relatively thin portion at its point of connection with the member, a screw extending through the perforations in the straps and lens, and a nut threaded onto the end of the screw to engage the wedge-shaped strap, the perforation in the wedge-shaped strap being larger than the screw to permit lateral movement of the screw and the engagement of the nut with the wedge-shaped strap acting upon relative rotation of the screw and nut to draw the member inwardly of the lens to seat its shoe against the edge of the lens, bend the wedge-shaped strap against the face of the lens and cramp the nut on the screw to lock it in place.

3. An improved mounting for eyeglasses and spectacles comprising a member having a strap adapted to overlie one face of the lens and a shoe for engagement with the edge thereof, said strap and lens having perforations and the outside face of the strap being inclined with respect to its inside face to provide a wedge of gradually increasing thickness from its point of connection with the shoe to its opposite end, and a stud extending through the perforations in the strap and lens and having fastening means at one end engageable with the relatively inclined outside face of the strap to cause the shoe to be tightly drawn against the edge of the lens upon relative rotation of the fastening means and stud, the perforation in the strap having the inclined face being larger than the stud to permit the stud to move laterally therein.

4. An improved mounting for eyeglasses and spectacles comprising a member having straps adapted to overlie the opposite faces of the lens and a shoe for engagement with the edge thereof, said straps and lens having perforations and one of said straps having its outside face inclined with respect to its inside face to provide a wedge of gradually increasing thickness from its point of connection with the shoe to its opposite end, a screw extending through the alined perforations in the straps and lens, the perforation in the strap having the inclined outside face being larger than the screw to permit lateral movement of the screw therein and the perforation in the lens being smaller than the perforation in the strap, and a nut threaded onto the screw and engageable with the inclined face of the strap, said nut and inclined face of the strap cooperating to tilt the screw toward the member to draw the latter onto the lens to tighten its shoe against the edge of the lens.

5. An improved mounting for eyeglasses and spectacles comprising a member having straps adapted to overlie the opposite faces of the lens and a shoe for engagement with the edge thereof, said straps and lens having perforations and one of the straps having its outside face inclined with respect to its inside face to provide a wedge of gradually increasing thickness from its point of connection with the shoe to its opposite free end, a screw extending through the straps and lens, and a nut threaded onto the screw and engageable with the inclined face of the strap, the perforation in the strap having the inclined face being larger than the screw to permit lateral movement of the screw therein and the perforation in the lens being smaller than the perforation in the strap whereby the engagement of the nut with the inclined face of the strap will act upon relative rotation of the nut and screw to draw the member inwardly of the lens to seat its shoe against the edge of the lens and cramp the nut on the screw to cause it to bind thereon.

FREDERICK A. STEVENS.